J. A. FINCH.
Opera-Glass.
No. 198,195.  Patented Dec. 18, 1877.
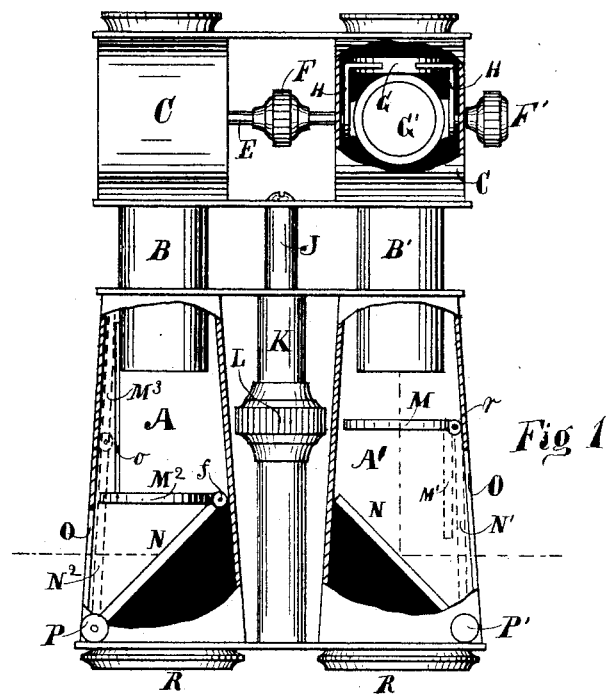
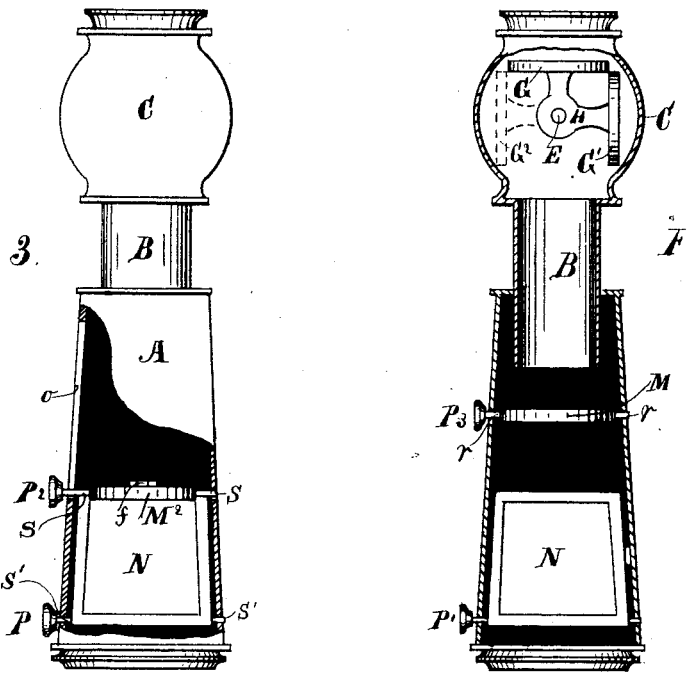
WITNESSES:
E. O. Shink
S. C. Fink
INVENTOR.
John A. Finch
by Chas. E. Marsh his atty.

UNITED STATES PATENT OFFICE.

JOHN A. FINCH, OF INDIANAPOLIS, INDIANA.

IMPROVEMENT IN OPERA-GLASSES.

Specification forming part of Letters Patent No. 198,195, dated December 18, 1877; application filed October 8, 1877.

*To all whom it may concern:*

Be it known that I, JOHN A. FINCH, of the city of Indianapolis, county of Marion, and State of Indiana, have invented a new and useful Improvement in Opera-Glasses, which is fully set forth in the following specification and the accompanying drawings.

The object of my invention is to enable a person in using an opera-glass to see objects to the right or left without leveling the barrels of his glass in those directions. Persons in an assembly may, by means thereof, be easily seen through one barrel of an opera-glass without being subjected to what is frequently considered an annoyance in having an opera-glass pointed directly at them.

My invention consists in arranging a mirror within one or both barrels of an opera-glass, and a second or extra object-glass between the mirror and the eyeglass, so that the objects at the right or left reflected in the mirror shall be visible, through the second object-glass, to the eye at the eyeglass, and magnified in the ordinary manner of field or opera glasses. An opening the size of the mirror is made at the side and at the large end of the lower barrel, and for convenience of manufacture and operation the lower barrels are made square.

When it is desired to take a direct front view by leveling the glasses directly at the object sought to be seen, the second object-glass and the mirror are folded to one side, out of the way, and the glass is used in the ordinary manner.

My improved glass thus becomes useful to view objects by pointing the barrels directly at them, or, on the other hand, as may be desired, to view them while apparently looking in another direction. While looking at objects to the left or right, the first or main object-glass is obscured by the mirror falling obliquely across the field of that object-glass, and the second object-glass, coming down to its place, takes the vision from the mirror, and conveys the reflection therein from side objects to the eye at the eyeglass, duly magnified.

To make my invention the more effective, I have one or more eyeglasses of varying power in the same barrel, attached by arms to, and made to revolve on, a shaft. Any one of these glasses best suiting the eye may be used at will, simply by revolving the shaft by a small thumb-screw or crank.

Ordinarily it is intended to confine my improvement to but one of the barrels of an opera-glass; but it is obvious that it may be so constructed that objects in the mirror may be looked at by both eyes and through two barrels. It is equally applicable, also, to field and spy glasses.

Figure 1 is a sectional view of the two lower or larger barrels A and A' of an opera-glass made with my improvement, and an exposed section of the upper cases or barrels C C.

Figs. 2 and 3 give views of the entire barrels at right angles to the view in Fig. 1. N are the mirrors; $M^2$, the second object-glass in position for viewing side objects. (Best seen in Fig. 1.)

The dotted lines $N^2$ and $M^3$ show the position of the second object-glass and mirror when both are folded away at the side of the barrel A, leaving the field of the first or main object-glass unobstructed and ready for use in the ordinary manner. The second object-glass and the mirror are hinged together at $f$ in the barrel A, the mirror, at its lower edge, being hinged to the bottom of the barrel at P, thus allowing the second object-glass and the mirror, when side views are not desired, to be stretched out in one line and laid up against the side of the barrel A. They are thus raised and stretched out by means of the projecting knob $P^2$, attached to the rod S, as seen in Fig. 3, the said rod working up and down in the slot $o$. This rod and knob constitute a handle for operating the second object-glass and mirror. O is an opening through the side of the barrel, admitting light to the mirror from side objects.

The barrel A' is illustrative of another method that may be adopted in hinging and hanging the mirror and second object-glass. In this illustration the mirror, unlike the one in barrel A, is hinged only at its lower end $P^1$, where it is made to oscillate as on a shaft by means of a knob there shown. In this barrel the second object-glass is hinged at $r$, and in the same manner is made to oscillate on a like shaft by means of the knob $P^3$. (Seen in Fig. 2.)

The dotted lines $M^1$ and $N^1$, respectively, show the position of this second object-glass and mirror when laid against the side of the barrel, out of the way, when it is desired to level the glass directly at the object looked at. By thus bringing the second object-glass nearer to the eye than the first object-glass R, glasses of varying power, G and G', become necessary in the barrels C.

Two or three of these eyeglasses may be used to suit the vision of different people, and are so constructed on the revolving shaft E that by revolving by the knob F or F', any one of them, as desired, is brought before the eye. The upper case or barrels C are the same in structure with each other.

All other parts of the glass are made in the ordinary manner. J, K, and L indicate the ordinary mechanism for extending or shortening the distance between the eye and object-glasses.

I claim as my invention—

1. In an opera or field glass, the object-glasses M M$^2$ and mirrors N, provided with hinges, by means of which said object-glasses and mirrors may be adjusted in the barrel A, substantially as and for the purpose set forth.

2. The combination of the revolving eye-glass G G', of varying powers, with the adjustable second object-glass M M$^2$, adjustable mirrors, and openings O, substantially as described.

3. In an opera or field glass, the object-glass M and mirror N, provided with hinges, the object-glass and mirror moving independently of each other, and adapted to fold against the barrel A' when not in use, substantially as described.

4. The barrel of an opera-glass, provided with the slot $o$, handle P$^2$, affixed to the rod S, sliding in said slot, and operating the mirror N and object-glass M$^2$ in the barrel A, substantially as and for the purposes specified.

In testimony whereof I have signed my name to this specification in the presence of two subscribing witnesses.

JOHN A. FINCH.

Witnesses:
CHAS. E. MARSH,
GUILFORD A. DEITCH.